United States Patent
Blackburn et al.

(10) Patent No.: US 7,217,398 B2
(45) Date of Patent: May 15, 2007

(54) DEPOSITION REACTOR WITH PRECURSOR RECYCLE

(75) Inventors: Jason Blackburn, Santa Clara, CA (US); Jeremie Dalton, San Jose, CA (US)

(73) Assignee: Novellus Systems, San Jose, CA (US)

( * ) Notice: Subject to any disclaimer, the term of this patent is extended or adjusted under 35 U.S.C. 154(b) by 567 days.

(21) Appl. No.: 10/329,251

(22) Filed: Dec. 23, 2002

(65) Prior Publication Data

US 2004/0120870 A1    Jun. 24, 2004

(51) Int. Cl.
*C23C 14/00* (2006.01)
*B01J 10/00* (2006.01)
*C23C 16/00* (2006.01)

(52) U.S. Cl. ............... 422/129; 427/255.26; 427/299; 427/331; 427/255.19; 438/478

(58) Field of Classification Search .......... 427/250, 427/255, 255.1, 255.3, 331, 255.26, 255.19, 427/299; 422/129; 438/478
See application file for complete search history.

(56) References Cited

U.S. PATENT DOCUMENTS

| | | | |
|---|---|---|---|
| 4,737,384 A * | 4/1988 | Murthy et al. ............... | 427/369 |
| 4,970,093 A * | 11/1990 | Sievers et al. ............... | 427/575 |
| 5,789,027 A * | 8/1998 | Watkins et al. ............... | 427/250 |
| 5,922,299 A | 7/1999 | Bruinsma et al. | |
| 6,420,301 B1 | 7/2002 | Kristen et al. | |
| 6,423,770 B1 | 7/2002 | Katz | |
| 6,444,715 B1 | 9/2002 | Mukherjee et al. | |
| 6,735,978 B1 * | 5/2004 | Tom et al. ..................... | 62/606 |
| 2003/0161780 A1 * | 8/2003 | Howard et al. ........... | 423/437.1 |
| 2004/0229023 A1 * | 11/2004 | Watkins et al. ............. | 428/209 |
| 2005/0181613 A1 * | 8/2005 | Xu et al. ..................... | 438/689 |

* cited by examiner

*Primary Examiner*—N. Bhat
(74) *Attorney, Agent, or Firm*—Lathrop & Gage LC

(57) ABSTRACT

A reactor vessel is provided with a solvent in a supercritical PVT state for use in depositing films on a deposition substrate. A metal organic precursor is dissolved in the supercritical solvent, as is a reaction agent. A chemical reaction deposits a film, such as a metal film on a semiconducting wafer, and reaction byproducts including a ligand ensue from the chemical reaction. Effluent from the reactor vessel is submitted to a precursor-forming agent that reacts with the ligand to rejuvenate the precursor. Alternatively, the precursor-forming agent can be used for point-of-use formation of the precursor with or without recycle of reaction byproducts.

26 Claims, 3 Drawing Sheets

DEPOSITION REACTOR WITH PRECURSOR RECYCLE

BACKGROUND OF THE INVENTION

1. Field of the Invention

The invention pertains to the field of methods and apparatus for materials deposition. More specifically, the materials are deposited as films using a supercritical deposition reactor with recycle of metal organic precursors.

2. Discussion of the Related Art

There are a variety of deposition processes for making thin film or thick film materials. For example, vacuum sputtering processes, spin-on deposition, and chemical vapor deposition processes are used to deposit thin films for use in semiconductors or optics. Chemical vapor deposition ("CVD") processes are those in which a volatile precursor liquid, typically a metal organic liquid, is vaporized in a carrier gas at reduced pressure and at an elevated temperature below the decomposition temperature of material in the combined flow stream. A chemical reaction may occur to deposit material on a deposition substrate, for example, by thermal activity from a heated wafer or by the activity of plasma in the case of plasma enhanced chemical vapor deposition ("PECVD").

U.S. Pat. No. 5,789,027 issued to Watkins et al. is hereby incorporated by reference to the same extent as though fully replicated herein. The '027 patent describes chemical fluid deposition ("CFD") processing where a precursor material is dissolved into a solvent that is maintained in a supercritical state. Solvents for this purpose include carbon dioxide, propane, butane, pentane, dimethyl ether, ethanol, nitrous oxide, water, and hexafluorobenzene. Precursors for use in CFD deposition processes are chosen to produce a desired material on the deposition substrate following reaction with a reaction agent. The reaction reagent may be dissolved in the supercritical solvent, or it may be the supercritical solvent itself. By way of example, materials that may be deposited and/or formed using CFD processes include:

metals, such as Cu, Pt, Pd, and Ti;
 elemental semiconductors including Si, Ge, and C;
 compound semiconductors including Group III-V semiconductors such as GaAs and InP; Group II-VI semiconductors such as CdS; and Group IV-VI semiconductors such as PbS;
 oxides such as $SiO_2$ and $TiO_2$; and
 mixed metals and/or mixed metal oxides such as the YBaCuO low temperature superconducting materials.

CFD processes produce high quality films and offer the advantage of low process temperatures of less than 250° C. or even less than 100° C. On the other hand, the reactor effluent is problematic. The processes are performed in a supercritical reactor vessel that must be pressurized and depressurized to accommodate new wafers for processing. The supercritical solvent contains potentially harmful chemicals that have been partially reacted to deposit materials on the wafers or other deposition substrates. The potentially harmful chemicals frequently contain heavy metals that cannot be destroyed, even by calcination. Upon depressurization, there is a need to vent the supercritical solvent and the chemicals dissolved in the supercritical solvent. Special precautions must be taken to protect the environment from exposure to these chemicals. Processing and disposal of the reactor effluent is complicated by, for example, the tendency of carbon dioxide to expand as a gas. The supercritical solvent with dissolved chemical reagents and reaction byproducts must be renewed for each cycle of deposition processing. This requirement presents a tremendous challenge and expense in accommodating process waste disposal needs.

SUMMARY

The art is advanced to overcome the problems outlined above by providing a precursor-forming agent that, in one embodiment, makes possible a fluid recycle system for use in CFD reactors. The precursor-forming agent reduces the amount of process waste material and/or forms precursor compositions at the point-of-use. The methodology of using this precursor-forming agent and/or the fluid recycle system improves yield and deposition rate by removing by-products and regenerating precursors to keep the precursor concentration high during the deposition process.

According to one embodiment, a reactor is used in film deposition processes. A solvent mixture contains a ligand that is dissolved in a solvent maintained at a supercritical or near supercritical state. A reactor vessel is configured to retain a deposition substrate for deposition processing. A precursor-forming agent is capable of reacting with the ligand in the solvent mixture to increase precursor concentration in the reactor. Conduit or piping is used to supply the reactor vessel with the supercritical solvent mixture, which includes the increased concentration of precursor resulting from reaction between the ligand and the precursor-forming agent. When deposition is concluded, substantially all of the supercritical reaction mixture may be saved for reuse on a successive batch of wafers, or the supercritical reaction mixture may be purged from the reactor.

By way of example, the precursor-forming agent can include a metal oxide, such as copper oxide. The solvent mixture can include carbon dioxide as the solvent and a β-diketonate as the ligand. Thus, the precursor may be a copper β-diketonate when copper oxide is the precursor-forming agent. In a supercritical solvent mixture of this type, hydrogen may be used as a reaction agent to induce deposition of a copper film.

In other embodiments, a scrubber is used to remove unwanted or deleterious reaction byproducts. For example, a molecular sieve or microporous material may be used for water removal.

In one embodiment, a two phase recycle system separates and processes respective liquid and gas phases that are flashed from the supercritical solvent mixture. The two phase recycle system is configured to submit at least one of the respective liquid and gas phases to the precursor-forming agent to establish a precursor rejuvenation reaction therewith. For example, the supercritical mixture may be flashed for phase separation with the liquid phase being submitted to the precursor-forming agent for reaction therewith.

In one embodiment that does not require gas and liquid phase separation, combined effluent from the reactor vessel is submitted to the precursor-forming agent for recycle during deposition processing.

In yet another embodiment, a supercritical solvent mixture including a ligand is submitted for reaction between the ligand and the precursor-forming agent. This provides for point-of-use precursor formation without necessarily having to recycle reactor vessel effluent. By way of example, point-of-use formation is helpful in circumstances the precursor is thermodynamically unstable under storage conditions.

In one embodiment, a method of film deposition utilizes the foregoing reactor. A solvent mixture containing a ligand dissolved in a solvent is provided to the reactor. The ligand component is reacted with the precursor-forming agent to provide an increased concentration of precursor in the reactor. The reactor vessel is supplied with the solvent mixture including the increased concentration of precursor. The solvent is maintained in a supercritical or near-supercritical state to form a film on a deposition substrate within the reactor vessel.

As used herein, a "supercritical" state means a state where a gas is heated above a critical temperature such that the gas cannot be liquefied by pressure. The term "supercritical" is also applied to gasses that are maintained at or in a near supercritical state. A "near-supercritical state" is one in which the reduced temperature and reduced pressure are both greater than 0.8, but is not a supercritical state in the sense of being heated above a critical temperature. Reduced temperature is calculated as actual temperature measured in Kelvin divided by the critical temperature of the solvent measured in Kelvin. Reduced pressure is calculated as actual pressure divided by critical pressure of the solvent. The term "supercritical solvent" includes a single solvent and is also meant to include a mixture of two or more different individual solvents both in a supercritical or near-supercritical state. A "supercritical solvent mixture" means a composition, such as a solution or nonhomogenous mixture, that contains a solvent in supercritical state; but components or fractions dissolved into the solvent, such as precursor vapor and reaction agents, are not necessarily also in a supercritical state according to PVT characteristics of their respective fractions.

Upon reading the following detailed description, in addition to the accompanying drawings, those skilled in the art will appreciate additional advantages disclosed.

DETAILED DESCRIPTION

There will now be shown and described, by way of example, and not by limitation, one embodiment of a CFD reactor 100 that incorporates a multiple phase (liquid and gas) fluid recycle system 102. The fluid recycle system 102 advantageously keeps the precursor concentration high during a single deposition.

Figure 1:
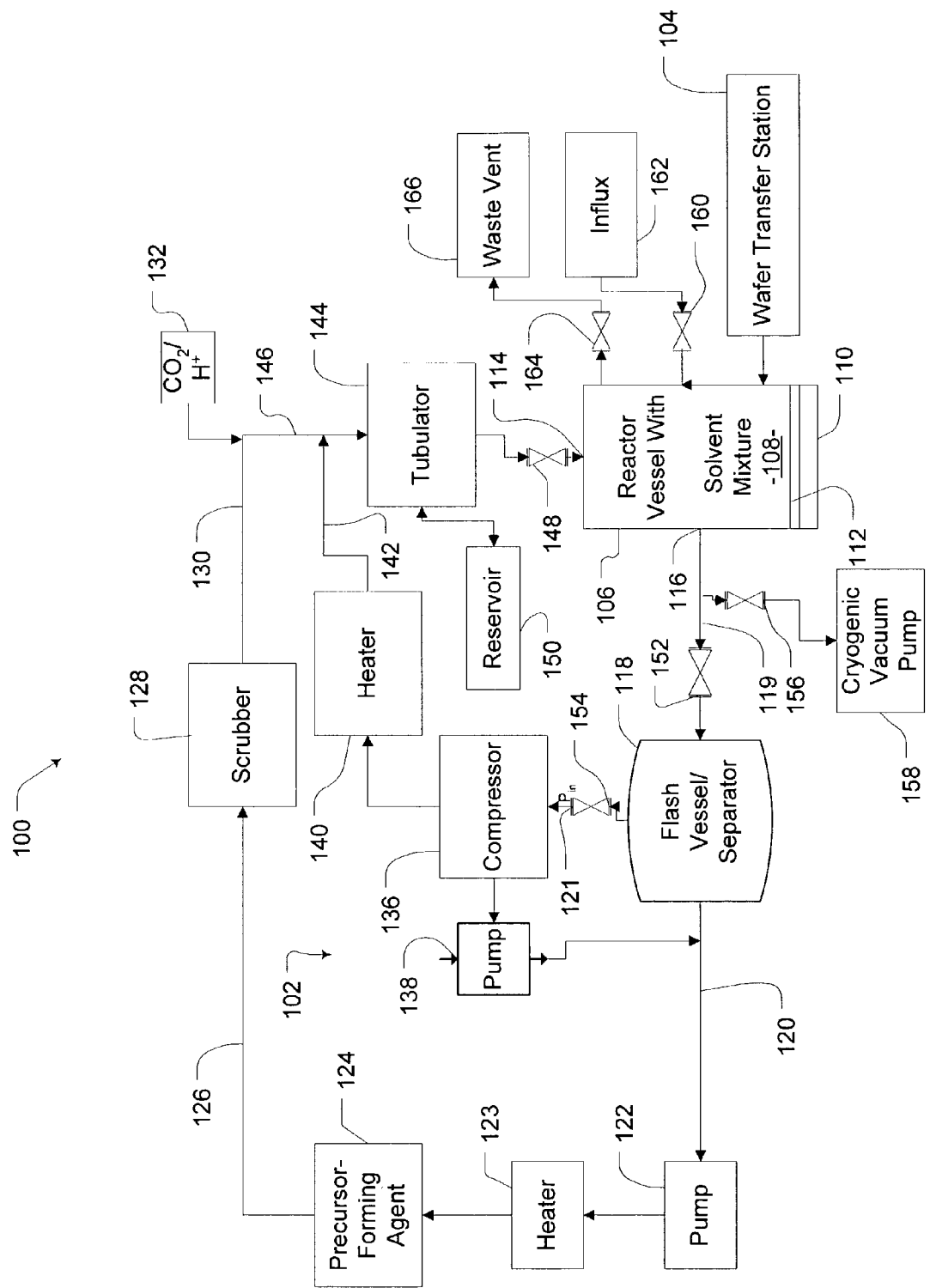
FIG. 1 is a block process diagram of a one reactor for use in supercritical deposition processes.

As shown in the embodiment of FIG. 1, a wafer transfer station 104 is, for example, a robotic arm assembly or wafer conveyor that periodically moves wafers into and out of a reactor vessel 106. The reactor vessel 106 is filled with a supercritical solvent mixture 108. A wafer 110, such as a silicon wafer or GaAs wafer, is being processed to form a deposited film 112 on wafer 110. The supercritical solvent mixture 108 contains a supercritical solvent, as well as a dissolved precursor and a reaction agent that react chemically to form film 112. By way of example, where the incipient deposited film 112 is copper, the film 112 may be deposited according to a reaction that occurs in a supercritical carbon dioxide solvent. In one example, the reaction occurs between a copper 1,1,1,5,5,5-hexafluoroacetylacetonate precursor and hydrogen as the reacting agent:

$$Cu(HFAC)_2 + H_2 \rightarrow Cu \cdot + 2H(HFAC), \tag{1}$$

where HFAC represents 1,1,1,5,5,5,-hexafluoroacetylacetonate.

The reaction of Equation (1) may be stated more generally as:

$$M(L)_n + H_2 \rightarrow M + nHL \tag{2}$$

where M is a metal that is also the reaction product for deposition of film 112, L is a ligand, n is the valence state of the metal, M(L), is the precursor, $H_2$ is the reaction agent, M and nHL is a reaction product.

In this embodiment, the supercritical solvent mixture 108 flows through reactor vessel 106 from an inlet 114 to an outlet 116. At the outlet 116, the supercritical solvent mixture 108 contains supercritical solvent, unreacted precursor, unreacted reaction agent, and reaction products of a chemical reaction between the precursor and the reaction products of the precursor and the reaction agent.

According to one embodiment, the multiple phase fluid recycle system 102 condenses for recycle and/or rejuvenation by taking advantage of pressure-volume-temperature (PVT) relationships inherent to the supercritical solvent mixture 108. PVT phase diagrams are well known in the art, as are partial pressures and principles of fugacity. In general terms, the observed pressure of any system, e.g., gas or liquid system, is the sum of partial pressures according to Equation (3):

$$F = \Sigma F_i, \tag{3}$$

where F is the observed actual pressure of a non-ideal mixture and $F_i$ is the fugacity as actual partial pressure of each component or $i^{th}$ fraction of the non-ideal mixture. In a dual-phase system that contains both a liquid phase and a gas phase at equilibria, the partial pressures $F_i$ for each component of each phase are equal. For example, in a system that contains 50% liquid including 5% water, the gas phase has a corresponding amount of water according to the partial pressure or fugacity of the water phase in each system:

$$F_{wliq} = F_{wgas}, \tag{4}$$

where $F_{wliq}$ is the fugacity of the water component of the liquid phase and $F_{wgas}$ is the fugacity of the water component of the gas phase. Accordingly, the PVT curves for each component may be used to design PVT conditions in a flash vessel 118, which receives reactor vessel effluent 119 from outlet 116. The PVT conditions in reactor vessel 118 are designed to condense liquids from the reactor vessel effluent 119. Appropriate conditions to accomplish condensation may, for example, be implemented by dropping pressure inside flash vessel 118 with associated expansion cooling sufficient to condense the liquids according to the PVT characteristics of the supercritical solvent, the precursor, the reaction agent, and the reaction products.

In one embodiment, flash vessel 118 is a two phase separator. In this embodiment, conditions of pressure and/or temperature inside flash vessel 118 form a liquid phase including combined liquid flow stream 120 that exits flash vessel 118. The combined liquid flow stream 120 includes condensed precursor liquids, condensed reaction products, condensed liquid reaction agent (if applicable), and/or liquid solvent. Hydrogen separation occurs within the flash vessel 118. For example, if the flash vessel 118 is maintained at 20° C. and the vapor pressure of the $CO_2$ at 20° C., the mixture separates into a liquid and vapor phase. A liquid phase flow stream 120 is primarily $CO_2$, ligand and precursor. A vapor phase flow stream 121 is a mixture of $H_2$ and $CO_2$. The liquid phase flow stream 120 is repressurized by injector pump 122, which is an accurate metering pump such as a fixed volume displacement pump. Injector pump 122 discharges into an optional heater 123, which heats liquid phase flow stream 120 to above the critical point before delivery for reaction with precursor-forming agent 124. The optional heater 123 is provided when it is advantageous for the reaction between liquid phase flow stream 120 and the precursor forming agent 124 to occur while the solvent is in the critical state. Diffusion of the precursor ligands to the precursor forming agent surface is faster when the solvent is in a supercritical state. The precursor-forming agent 124 reacts with the condensed reaction products of Equations (1) and/or (2) to rejuvenate the precursor liquid. For example, where a copper deposition process has occurred inside the reactor vessel 106 according to Equation (1) above, the precursor-forming agent 124 may be a packed bed of copper oxide that reacts with elements of the combined flow stream 120 starting with the reaction products of Equation (1) and according to Equation (5):

$$2H(HFAC)+CuO \rightarrow Cu(HFAC)_2+H_2O, \quad (5)$$

where HFAC is defined above.

More generally, the reaction shown in Equation (5) may be stated as:

$$nHL+MO_{n/2} \rightarrow M(L)_n+n/2H_2O, \quad (6)$$

where M, L and n are defined above.

Thus reacted by the precursor-forming agent 124 to restore the original precursor, deleterious reaction byproducts are eliminated from a rejuvenated liquid flow stream 126 by scrubber 128, at least to the extent that elimination of deleterious reaction products may be required. In one embodiment, scrubber 128 embodies structure that implements physical and/or chemical processing to remove unwanted materials from the rejuvenated flow stream 126. By way of example, scrubber 128 may contain a microporous sieve to eliminate the water byproduct of Equations (5) and (6) above. In another example, scrubber 128 uses a cryogenic compression separator to separate hydrogen if the hydrogen content becomes too high. A scrubbed liquid flow stream 130 may be supplemented, as needed, by a reaction agent, such as hydrogen 132 and/or additional solvent (e.g., carbon dioxide).

The gas phase flow stream 121 exits flash vessel 118 and is repressurized by compressor 136. Where repressurization results in a lower temperature than the supercritical temperature for the solvent, additional liquids may condense, which are combined with the liquid phase flow stream 120 by the action of pump 138. Compressed gas from compressor 136 is naturally heated by the action of compressor 136, and may be further heated, as needed, by heater 140 to establish the desired supercritical solvent conditions within reactor vessel 106. Heater 140 discharges compressed recycle gas 142 into turbulator 144 for mixing to dissolve pressurized liquids in liquid discharge line 146.

When film 112 is fully deposited, the reactor vessel 106 may be isolated by positioning three way valve 148 to divert the output of turbulator 144 into a reservoir 150 for storage. In one embodiment, the reservoir 150 has a volume equal to the volume inside reactor vessel 106. Reservoir 150 is maintained at conditions of temperature and pressure that are identical to conditions for deposition inside reactor vessel 106. In another embodiment, the reservoir 150 is maintained at a higher temperature that compensates for, and prevents condensation of, liquids when the contents of reservoir 150 are charged back into reactor vessel 106.

In yet another embodiment, three way valve 148 is positioned to charge reservoir 150. Compressor 136 and injector pump 122 operate as before until the intake pressure $P_{in}$ of compressor 136 reaches a predetermined minimum limit. At this point, isolation valves 152 and 154 are closed and a cryo valve 156 is opened to expose gas phase material remaining within the reactor vessel 106 to cryogenic contact, for example, by exposure to the temperature of liquid nitrogen or liquid helium in a cryogenic vacuum pump 158. The cryogenic vacuum pump 158 can have a roughing pump to bring the pressure down to about 100 m Torr before the cryogenic vacuum pump 158 is used. According to the principle of operation in cryogenic vacuum pump 158, exposing the remnants of supercritical solvent mixture 108 to cryogenic temperatures solidifies these remnants by freezing. This cryogenic contact draws down the remaining pressure within reactor vessel 106 to a strong vacuum having only trace amounts of gas residue and essentially no organic or organometallic components. Cryo valve 156 is closed and influx valve 160 is opened to charge reactor vessel 106 with an influx gas 162, for example, air. The reactor vessel 106 may then be opened for activity by the wafer transfer station 104, which removes wafer 110 and inserts a new wafer (not shown).

In some embodiments, once a new wafer 110 is in place, influx valve 160 is closed. The reactor vessel 106 is purged with pure $CO_2$ or $CO_2/H_2$. This is because it is likely that reactants will fall out of solution if the reactor vessel 106 is purged with the contents of reservoir 150. Vent valve 164 is closed once purging is complete, and three way valve 148 remains open to charge reactor vessel 106 with predetermined conditions of pressure and temperature, such as supercritical conditions.

In alternative embodiments, as opposed to opening cryo valve 156 with the isolation valve 152 and three way valve 148 in closed configuration, the influx valve 160 may be opened, as is vent valve 164 leading to a waste disposal vent 166. Thus, reactor vessel 106 is flushed by the influx gas 162 discharging through waste disposal vent 166 without drawing reactor vessel 106 to vacuum through use of the cryogenic vacuum pump 158. In still other embodiments, three way valve 148 and isolation valve 152 may be closed to isolate reactor vessel 106 with the supercritical solvent mixture 108 still in a supercritical state. Vent valve 164 may be opened to purge the supercritical solvent mixture, and influx valve 160 may be opened to flush reactor vessel 106 with influx gas 162.

Those skilled in the art will appreciate the advantages that are obtained by deposition processing, such that a wafer 110, or a plurality of such wafers, in the reactor vessel 106 are continuously fed reagents for deposition of film 112 where the concentration of these reagents is maintained at a constant level. The reagents are continuously fed to the reactor vessel 106 and rejuvenated through use of the fluid recycle system 102 until the reactor vessel 106 is depressurized and the wafer 110 is removed. The fluid recycle system 102 improves process efficiency and yield by maintaining the reagent concentration at a relatively high level that does not deplete during deposition processes.

Figure 2:
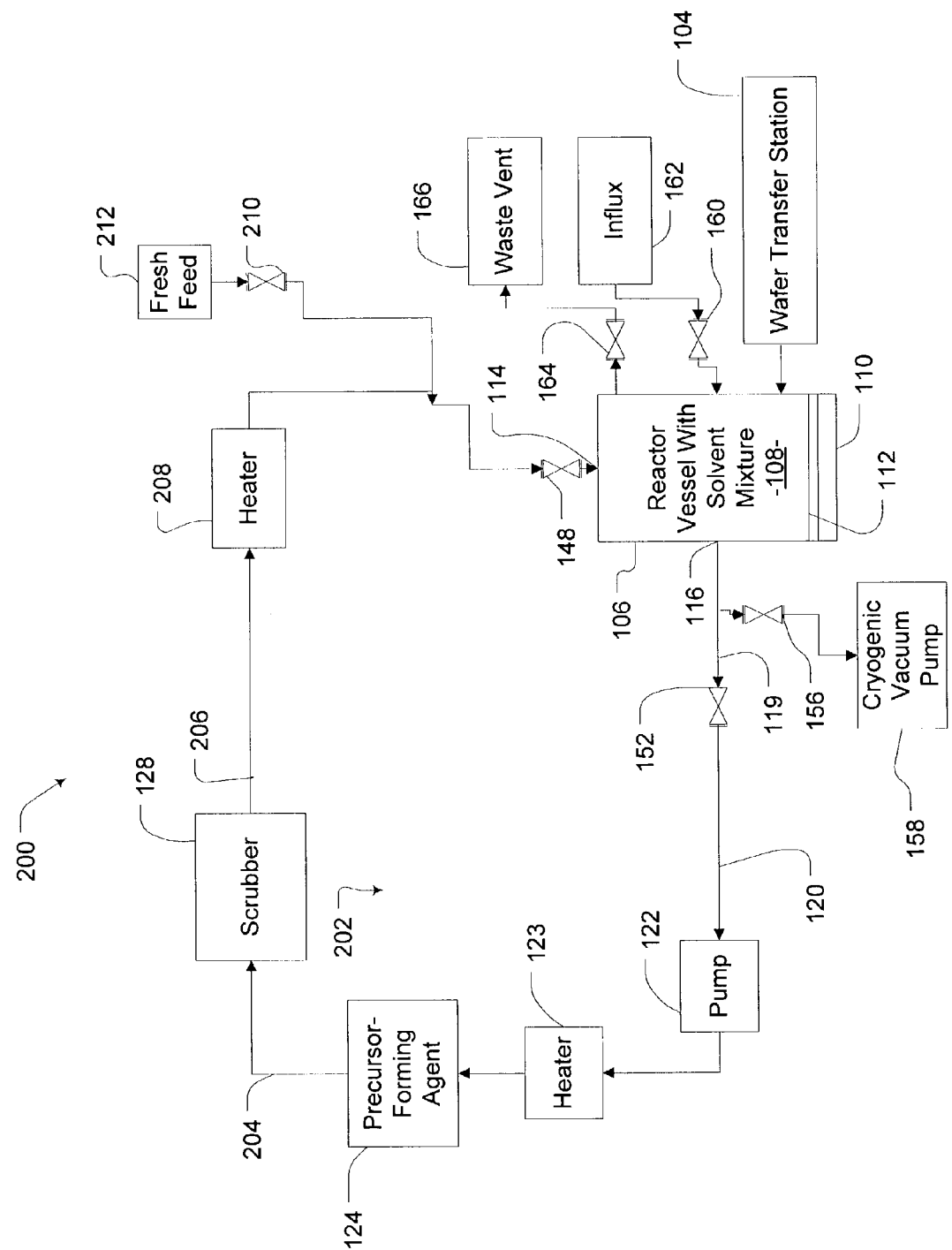
FIG. 2 is a block process diagram of another reactor for use in supercritical deposition processes.

In still other embodiments, waste gas discharge from reactor vessel 106 may not be usable on repeat wafers or batches of wafers, or the waste gas discharge may not be of a type that creates waste disposal problems, for example, where the waste gas effluent is a feedstock for other processes. FIG. 2 is a process schematic diagram showing another supercritical deposition reactor 200, which contains a supercritical state recycle system 202. In FIG. 2, like numbering of identical or similar components is retained with respect to FIG. 1. It will be appreciated that the reactor 100 shown in FIG. 1 may be operated according to the embodiment shown in FIG. 2 via closure of isolation valve 156. FIG. 2 differs from FIG. 1 in that the supercritical solvent 108 is purged through vent valve 164 and waste vent 166 after each process run.

During deposition processing according to the embodiment shown in FIG. 2, reactor vessel effluent 119 passes directly to the injector pump 122, which provides pressurization and motive force for circulation of the scrubbed flow stream 206. Injector pump 122 discharges into the precursor-forming agent 124 for rejuvenation of the precursor component according to Equations (5) and (6). A liquid flow stream 204 including the rejuvenated precursor, reacting agent, supercritical solvent, and reaction byproducts enters scrubber 128 for removal of reaction byproducts, e.g., water. Scrubber 128 discharges a scrubbed flow stream 206 into heater 208, which compensates for system thermal losses and imparts sufficient heat to maintain supercritical conditions within reactor 200. A batch valve 210 is selectively opened to charge reactor vessel 106 with fresh feed 212 including, for example, a fresh supercritical solvent mixture that contains solvent in a supercritical state, precursor and reaction agent. Batch valve 210 may be closed during deposition of film 112.

The reactor 200 is purged with batch valve 210 in a closed position by opening vent valve 164 and opening influx valve 160. During purge operations, pump 122 may be actuated to further purge the precursor-forming agent 124, scrubber 128, and heater 208. Reactor vessel 106 is then charged by closing influx valve 160, opening batch valve 210, and circulating fresh feed 212 through vent valve 164. Pump 122 is activated to charge the remainder of deposition reactor 200. Vent valve 164 is closed to charge reactor 200 with fresh feed 212 in a supercritical state.

In one embodiment, the reactor 200 does not retain the supercritical solvent mixture 108 between wafer deposition runs. Even so, the supercritical state recycle system 202 accelerates the time that is required between deposition runs. This advantage results when the precursor-forming agent 124 reduces the concentration of reaction products shown in Equations (1) and (2), and particularly the concentration of the ligands L or HFAC. The equilibrium of Equations (1) and (2) favors the formation of precursor, e.g., $M(L)_n$, such that a larger concentration of precursor exists in the supercritical solvent mixture 108 and deposition of film 112 proceeds more rapidly than it would if free ligand byproducts L remain in solution to displace and compete with the precursor undergoing reaction at wafer 112.

Figure 3:
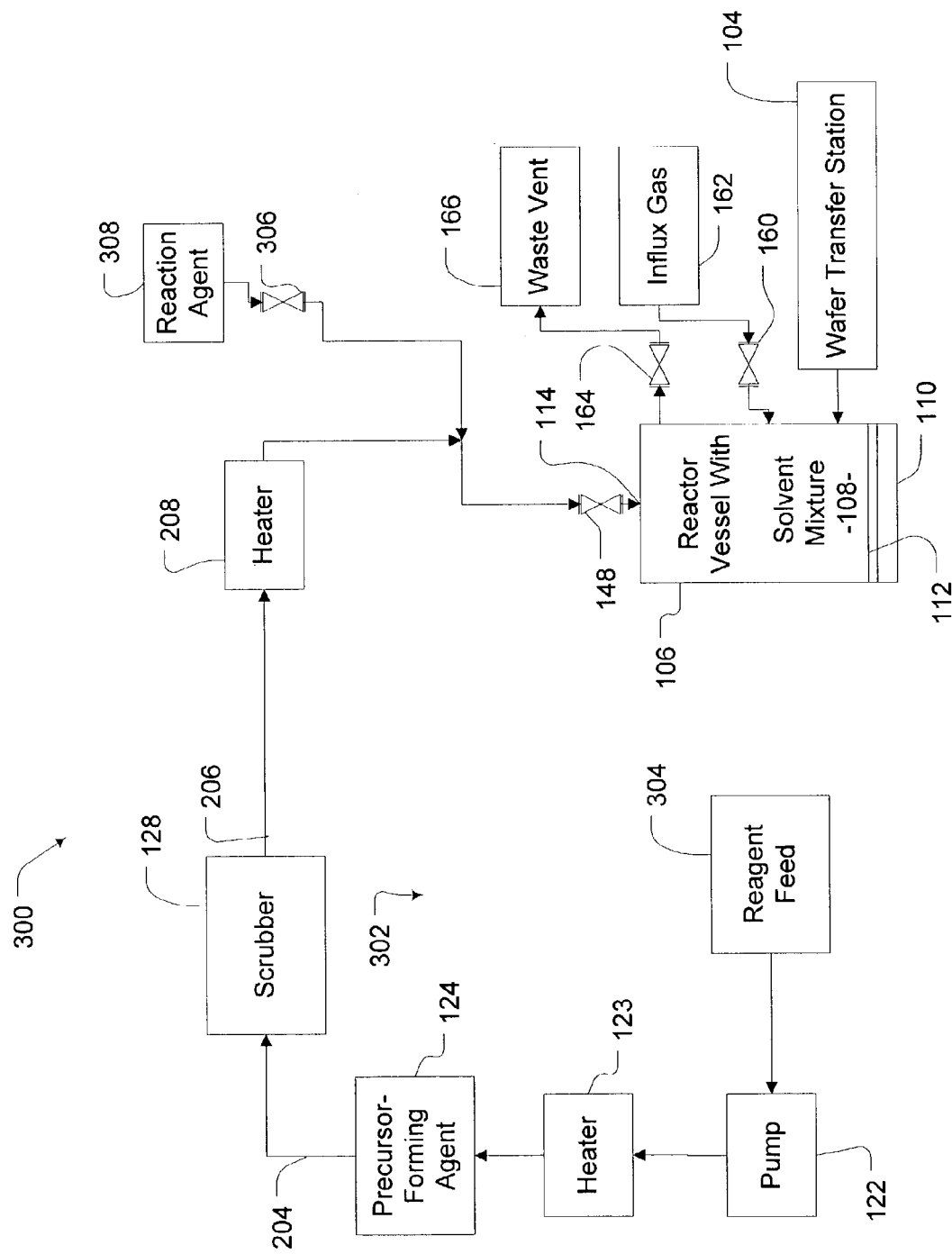
FIG. 3 is a block process diagram of a yet another reactor for use in supercritical deposition processes.

FIG. 3 depicts a supercritical deposition reactor 300, which has no recycle system. In FIG. 3, like number has been retained for identical or similar elements with respect to FIGS. 1 and 2. Although the reactor 300 has no recycle system, it contains a point of use precursor synthesizer 302 that operates by supplying a reagent feed 304 to the injector pump 122 and the precursor-forming agent 124. In one embodiment, the reagent feed 304 includes ligand L (e.g., H-HFAC) dissolved in a supercritical solvent. The precursor-forming agent 124 contains a material, such as the packed bed of copper oxide, that reacts with the ligand in the reagent feed 304 to synthesize the precursor. Byproducts of the precursor synthesis are optionally removed by scrubber 126. Two way valve 306 controls delivery of the reaction agent 308, e.g., $H_2$. Purging of reactor 300 bietween process runs occurs by closure of two way valve 306 and opening of vent valve 164. Two way valve 148 may be selectively closed to accommodate the need to purge reactor vessel 106 with influx gas 162 for the operations of wafer handling station 104.

Solvents that can be used as supercritical fluids are well known and are sometimes referred to as dense gases, e.g., as discussed in Sonntag et al., Introduction to Thermodynamics, Classical and Statistical, 2nd ed., John Wiley & Sons, 1982, p. 40. At temperatures and pressures above certain values for a particular substance, which are defined as the critical temperature and critical pressure, respectively, the saturated liquid and saturated vapor states are identical and the substance is referred to as a supercritical fluid. Solvents that are supercritical fluids are less viscous than liquid solvents by one to two orders of magnitude. In CFD, the low viscosity of the supercritical solvent improves transport of reagents to, and decomposition products away from, the incipient film 112. Generally, a supercritical solvent can be composed of a single solvent or a mixture of solvents, including for example a small amount (<5 mol %) of a polar liquid co-solvent such as methanol.

The reagents are sufficiently soluble in the supercritical solvent to allow homogeneous transport of the reagents. Solubility in a supercritical solvent is generally proportional to the density of the supercritical solvent. Ideal conditions for CFD include a supercritical solvent density of at least 0.2 g/cm$^3$ or a density that is at least one third of the critical density (the density of the fluid at the critical temperature and critical pressure). Solvents that have been used in CFD processes include carbon dioxide, propane, butane, pentane, dimethyl ether, ethanol, nitrous oxide, water, and hexafluorobenzene. Carbon dioxide, which has a $T_c$ of 304.2° K. and $P_c$ of 72.8 atm, is particularly preferred.

Precursors used in the foregoing processes are preferably metal-organic complexes. Useful examples of precursors include:

beta diketonates, such as copper 1,1,1,5,5,5, hexafluoroacetylacetonate and palladium hexafluoroacetylacetonate;

alkyls, such as diethyl zinc or dimethylcyclooctadiene platinum;

allyls, such as bis(allyl)zinc $W(\pi^4\text{-allyl})_4$;

dienes, such as dimethylcyclooctadiene platinum; and/or metallocenes, such as $Ti(\pi^5\text{-}C_5H_5)_2$ or $Ni(\pi^5\text{-}C_5H_5)_2$.

Generally, other precursors commonly used in CVD processes may also be used in supercritical reactor processes. A wider variety of precursors may be used in CFD processes, as compared to CVD processes, because the CFD processes replace the requirement that CVD precursors have high vapor pressure. CFD processes merely require that the precursor dissolve in the supercritical fluid, and this requirement is easier to achieve than additionally requiring high vapor pressure or high volatility.

Solubility of the precursor at the reaction conditions can be verified in a variable volume view cell, which is well known in the art, e.g., as described in McHugh et al, Supercritical Fluid Extraction: Principles and Practice; Butterworths: Boston, 1986. Known quantities of precursor and supercritical solvent are loaded into the view cell, where they are heated and compressed to conditions at which a single phase is observed optically. Pressure is then reduced isothermally in small increments until phase separation (either liquid-vapor or solid-vapor) is induced.

In various embodiments of CFD processes, a reaction agent may be added to react the precursor for deposition of one or more reaction products on a deposition substrate. The reaction agent may include: a reducing agent, such as diatomic hydrogen or hydrogen sulfide; a hydrolyzing agent, such as water; and/or oxidizers, such as oxygen. By way of example, water may react with a metal alkoxide, e.g., titanium tetraisopropoxide, to produce titanium dioxide or an intermediate polymerized composition useful in forming titanium dioxide. In another example, oxygen may react with zirconium beta diketonate in producing zirconium oxide. The reaction agent may also be radiation, such as ultraviolet radiation, resulting in photolysis at the surface of wafer 112. Photolysis may be assisted by the addition of an ultraviolet photolysis initiator, such as a benzoin ether.

Process conditions of temperature and pressure depend upon the reagents and choice of solvent. Generally, temperature is less than 250° C. and often less than 100° C., while the pressure is often between 50 and 500 bar. A temperature gradient between the deposition substrate and solution can also be used to enhance chemical selectivity, for example, by heating of the wafer 112. Similarly, unwanted deposition can be prevented, for example, by cooling the walls of reactor vessel 106. This cooling naturally occurs when the reactor vessel 106 is exposed to ambient room temperatures.

EXAMPLE 1

CFD with Multiple Phase Recycle

A silicon wafer was placed in a reactor vessel 106 and heated to 200° C. Research grade copper 1,1,1,5,5,5, hexafluoroacetylacetonate was purchased on commercial order from Strem Chemical. An 11 gram portion of copper 1,1,1,5,5,5, hexafluoroacetylacetonate was dissolved in carbon dioxide having a volume of 15 liters at supercritical conditions of 60° C. and 207 bar. A 4 g quantity of hydrogen gas was added to the reaction mixture, which was introduced to the reaction vessel. The reaction mixture flowed through the reactor vessel 106 at 5 liters per minute for 3 minutes to react as shown in Equation (1). Conditions inside the flash vessel 118 were 20° C. and 57 bar, which resulted in a stabilized liquid flow of about 4600 cubic centimeters per minute. The liquid phase was heated to 150° C. and compressed to 207 bar. The supercritical solution with the dissolved ligand reacted according to Equation (5) with a precursor-forming agent formed of 5 kg of copper (II) oxide in a packed bed at 150° C. and 207 bar. The rejuvenated supercritical phase was then mixed with $H_2$ for resubmission to the reactor vessel 106. The reactor vessel 106 was purged at the end of deposition. The resultant film 112 was a high quality copper film 25 nm thick suitable for use in damascene wiring of integrated circuits.

The foregoing discussion is intended to illustrate certain features by way of example with emphasis upon the preferred embodiments and instrumentalities. It will be appreciated that the various functionalities described above may be performed by similar means, such as by separating functions for dual-purpose processing chambers for implementation in separate processing chambers. Accordingly, the disclosed embodiments and instrumentalities are not exhaustive of all options or mannerisms for practicing the disclosed principles herein. The inventors hereby state their intention to rely upon the Doctrine of Equivalents in protecting the full scope and spirit of the invention.

We claim:

1. A reactor for film deposition processes utilizing a solvent mixture that contains a ligand dissolved in a solvent maintained at a supercritical or near supercritical state, comprising:

a reactor vessel configured to retain a deposition substrate for deposition processing;

a flash system that contains a solvent at or near a supercritical state, the solvent containing a precursor that is reactive to form a film on the deposition substrate and a ligand resulting from such reaction, a precursor-forming agent capable of reacting with the ligand to increase the concentration of precursor in the solvent, thereby providing a rejuvenated solvent; and the recycle system being configured to discharge reacted solvent with ligand from the reactor vessel after reaction to form the film, reacting the precursor-forming agent with the ligand to increase the concentration of the precursor in the solvent and so provide a rejuvenated solvent, and introduce the rejuvenated solvent to the reactor vessel.

2. The reactor of claim 1, wherein the precursor-forming agent includes a metal bonded to the ligand.

3. The reactor of claim 2, wherein the metal includes copper.

4. The reactor of claim 1, wherein the solvent mixture includes carbon dioxide as the solvent.

5. The reactor of claim 1, wherein the ligand includes a β-diketonate.

6. The reactor of claim 5, wherein the precursor includes a copper β-diketonate.

7. The reactor of claim 6, further comprising the solvent as carbon dioxide, and a reaction agent including hydrogen.

8. The reactor of claim 1, wherein the two phase recycle system is suitable for respective liquid and gas phases, the two phase recycle system being configured to submit at least one of the respective liquid and gas phases to the precursor-forming agent to establish the precursor rejuvenation reaction therewith.

9. The reactor of claim 8, wherein the two phase recycle system is configured to submit the liquid phase to the precursor-forming agent.

10. The reactor of claim 1, further comprising a scrubber to remove deleterious reaction byproducts from the recycle system.

11. The reactor of claim 10, wherein the scrubber comprises a microporous sieve for removal of water.

12. The reactor of claim 1, further comprising means for submitting mixed effluent from the reactor vessel to the precursor-forming agent for recycle during deposition processing.

13. The reactor of claim 1, further comprising means for submitting the solvent mixture to the reactor vessel after reaction with the precursor-forming agent to produce a combined flow stream including the precursor, and selectively without recycle of reactor vessel effluent.

14. A method of film deposition in a reactor, comprising the steps of:

providing a solvent mixture that contains a ligand dissolved in a solvent;

reacting the ligand with a precursor-forming agent to provide an increased concentration of precursor in the reactor;

supplying the reactor vessel with the solvent mixture including the increased concentration of precursor while the is solvent maintained in a supercritical or near-supercritical state, to form a film on a deposition substrate with reaction to liberate ligand material, and recycling the solvent mixture through the steps of reacting the ligand and supplying the reactor for repeated film depositions with renewal of the precursor-forming agent in the solvent.

15. The method of claim 14, wherein the precursor-forming agent used in the step of reacting includes a metal.

16. The method of claim 14, wherein the precursor-forming agent used in the step of reacting includes copper.

17. The method of claim 14, wherein the solvent mixture in the step of providing includes carbon dioxide as the solvent.

18. The method of claim 14, wherein the ligand used in the step of providing includes a β-diketonate.

19. The method of claim 18, wherein the precursor fanned in the step of reacting includes a copper β-diketonate.

20. The method of claim 19, wherein the solvent in the step of providing includes carbon dioxide, and further comprising a step of adding a reaction agent including hydrogen.

21. The method of claim 14, the step of recycling includes steps of:
    separating effluent from the reaction vessel into respective liquid and gas phases, and
    submitting at least one of the respective liquid and gas phases for the step of reacting.

22. The method of claim 21, wherein the step of submitting includes submitting the liquid phase for reaction with the precursor-forming agent.

23. The method of claim 14, further comprising a step of scrubbing to remove deleterious reaction byproducts after the reacting step.

24. The method of claim 23, wherein the step of scrubbing includes removing water.

25. The method of claim 14, further comprising a step of submitting combined effluent from the reactor vessel to the precursor-forming agent for recycle during deposition processes that occur in the step of submitting.

26. The method of claim 14, further comprising a step of submitting the solvent mixture to the reactor vessel after reaction with the precursor-forming agent to produce a combined flow stream including the precursor selectively without recycle of reactor vessel effluent.

\* \* \* \* \*

UNITED STATES PATENT AND TRADEMARK OFFICE
CERTIFICATE OF CORRECTION

PATENT NO.         : 7,217,398 B2                                            Page 1 of 1
APPLICATION NO. : 10/329251
DATED                : May 15, 2007
INVENTOR(S)       : Jason Blackburn et al.

It is certified that error appears in the above-identified patent and that said Letters Patent is hereby corrected as shown below:

Column 10, line 66, "supereritical" should read --supercritical--; line 67, "near-supereritical" should read --near-supercritical--;
Column 11, line 14, "fanned" should read --formed--

Signed and Sealed this

Twenty-sixth Day of June, 2007

JON W. DUDAS
*Director of the United States Patent and Trademark Office*